(12) United States Patent
Chen et al.

(10) Patent No.: US 11,543,931 B2
(45) Date of Patent: Jan. 3, 2023

(54) SYSTEMS AND METHODS FOR INTERACTING WITH A TABLETOP MODEL USING A MOBILE DEVICE

(71) Applicant: Ford Global Technologies, LLC, Dearborn, MI (US)

(72) Inventors: Yifan Chen, Ann Arbor, MI (US); Shan Chy Chueh, Ypsilanti, MI (US); David Melcher, Ypsilanti, MI (US); John Vincent, Livonia, MI (US); Kangning Chen, Detroit, MI (US); Jason Snow, Ferndale, MI (US); Girish Yadav, Dearborn, MI (US); Jiaqi Ma, Novi, MI (US); Robert Collard, Hazel Park, MI (US); Shuai Wang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 17/160,243

(22) Filed: Jan. 27, 2021

(65) Prior Publication Data

US 2022/0236855 A1 Jul. 28, 2022

(51) Int. Cl.
*G06F 3/04812* (2022.01)
*G09B 25/06* (2006.01)
(Continued)

(52) U.S. Cl.
CPC ........ *G06F 3/04812* (2013.01); *G06F 3/0346* (2013.01); *G06F 3/0354* (2013.01);
(Continued)

(58) Field of Classification Search
CPC ............ G06F 3/04812; G06F 3/04842; G06F 3/04883; G06F 3/0481; G06F 3/048;
(Continued)

(56) References Cited

U.S. PATENT DOCUMENTS

| 3,983,474 | A | * | 9/1976 | Kuipers | ............... G01S 1/42 |
| | | | | | 324/207.18 |
| 5,666,113 | A | * | 9/1997 | Logan | ............... G06F 3/0488 |
| | | | | | 341/22 |

(Continued)

OTHER PUBLICATIONS

Fei et al. (https://dl.acm.org/doi/pdf/10.1145/2512349.2512820; pub date: 2013; last downloaded on May 19, 2021); (Year: 2013).*
(Continued)

*Primary Examiner* — Dino Kujundzic
*Assistant Examiner* — Jianmei F Duckworth
(74) *Attorney, Agent, or Firm* — Brandon Hicks; Eversheds Sutherland (US) LLP

(57) ABSTRACT

Systems and methods interacting with tabletop models using a handheld device are provided herein. A display system includes a tabletop model, including a horizontal display that is configured to display a two-dimensional digital map and a three-dimensional physical model that is configured to overlay the two-dimensional digital map. The display system includes a mobile device including a touchscreen display. The display system transforms a movement on the touchscreen display to a movement of a cursor on the two-dimensional digital map.

17 Claims, 2 Drawing Sheets

(51) Int. Cl.
*G06F 3/04883* (2022.01)
*G06F 3/04842* (2022.01)
*G06F 3/0346* (2013.01)
*G06F 3/0354* (2013.01)

(52) U.S. Cl.
CPC ...... *G06F 3/04842* (2013.01); *G06F 3/04883* (2013.01); *G09B 25/06* (2013.01)

(58) Field of Classification Search
CPC .... G06F 3/0484; G06F 3/0488; G06F 3/0487; G06F 3/0346; G06F 3/0354; G09B 25/06; G09B 27/00; G09B 29/00
See application file for complete search history.

(56) References Cited

U.S. PATENT DOCUMENTS

| | | | |
|---|---|---|---|
| 6,686,909 B1* | 2/2004 | Endo | G06F 1/1601 345/173 |
| 6,894,678 B2* | 5/2005 | Rosenberg | G06F 3/016 345/157 |
| 7,394,459 B2* | 7/2008 | Bathiche | A63F 13/00 345/175 |
| 7,525,538 B2* | 4/2009 | Bathiche | G02B 5/282 345/175 |
| 7,548,232 B2* | 6/2009 | Shahoian | G06F 1/1616 345/156 |
| 7,743,348 B2* | 6/2010 | Robbins | G06F 3/0421 715/863 |
| 8,140,501 B2* | 3/2012 | Wu | G06F 16/289 707/705 |
| 8,199,105 B2* | 6/2012 | Kuenzner | G06F 3/0338 345/157 |
| 8,325,138 B2* | 12/2012 | Touma | G06F 3/0346 345/163 |
| 8,351,773 B2* | 1/2013 | Nasiri | G06F 1/1694 396/55 |
| 8,358,286 B2* | 1/2013 | Cannon | A63F 13/2145 345/174 |
| 8,378,797 B2* | 2/2013 | Pance | G08B 6/00 340/407.2 |
| 8,427,424 B2* | 4/2013 | Hartmann | G06F 3/0325 345/156 |
| 8,471,869 B1* | 6/2013 | Tseng | G09G 5/38 345/659 |
| 8,485,668 B2* | 7/2013 | Zhang | G03B 17/54 353/28 |
| 8,570,277 B2* | 10/2013 | Rekimoto | G06F 3/016 345/173 |
| 8,725,292 B2* | 5/2014 | Perlin | G05D 1/0231 700/245 |
| 8,970,486 B2* | 3/2015 | Alameh | G06F 3/011 345/156 |
| 9,239,622 B2* | 1/2016 | Park | G06F 3/0386 |
| 9,292,108 B2* | 3/2016 | Ballard | H04L 67/40 |
| 9,323,977 B2* | 4/2016 | Shim | G06K 9/00201 |
| 9,513,802 B2* | 12/2016 | Jang | G06F 3/0482 |
| 9,696,825 B2* | 7/2017 | Lin | G06F 3/038 |
| 9,740,290 B2* | 8/2017 | Rosenberg | G06F 3/0338 |
| 10,061,385 B2* | 8/2018 | Churikov | G06F 3/04883 |
| 11,003,257 B2* | 5/2021 | Gurovich | G06F 1/1684 |
| 2002/0003528 A1* | 1/2002 | Rosenberg | G06F 3/016 345/157 |
| 2005/0245302 A1* | 11/2005 | Bathiche | A63F 13/213 463/1 |
| 2006/0001650 A1* | 1/2006 | Robbins | G06F 3/04845 345/173 |
| 2006/0152497 A1* | 7/2006 | Rekimoto | G06F 3/0485 345/173 |
| 2006/0192755 A1* | 8/2006 | Blythe | G06F 3/0421 345/158 |
| 2006/0289760 A1* | 12/2006 | Bathiche | G02B 5/282 250/332 |
| 2007/0192719 A1* | 8/2007 | Chellis | G06F 3/04842 715/767 |
| 2007/0300307 A1* | 12/2007 | Duncan | G06F 21/36 726/27 |
| 2009/0058806 A1* | 3/2009 | Middler | G06F 3/0481 345/157 |
| 2009/0122009 A1* | 5/2009 | Kuenzner | G06F 3/0338 345/157 |
| 2009/0138499 A1* | 5/2009 | Nicholls | G06F 16/9038 |
| 2009/0158203 A1* | 6/2009 | Kerr | G06F 3/017 715/784 |
| 2010/0042258 A1* | 2/2010 | Perlin | G09B 9/04 700/258 |
| 2010/0079369 A1* | 4/2010 | Hartmann | G06F 3/04883 345/156 |
| 2010/0079385 A1* | 4/2010 | Holmgren | G06F 3/0418 345/173 |
| 2010/0315418 A1* | 12/2010 | Woo | G06F 3/011 345/419 |
| 2011/0012717 A1* | 1/2011 | Pance | G06F 3/04886 340/407.2 |
| 2011/0109545 A1* | 5/2011 | Touma | G06F 3/017 345/158 |
| 2011/0163955 A1* | 7/2011 | Nasiri | G06F 3/0485 345/158 |
| 2011/0216002 A1* | 9/2011 | Weising | A63F 13/213 345/158 |
| 2011/0292347 A1* | 12/2011 | Zhang | G03B 21/00 353/28 |
| 2012/0019480 A1* | 1/2012 | Cannon | A63F 13/2145 345/174 |
| 2012/0044177 A1* | 2/2012 | Ohta | A63F 13/2145 345/173 |
| 2012/0089940 A1* | 4/2012 | Jang | H04N 21/42224 715/780 |
| 2012/0326982 A1* | 12/2012 | Pasquero | G06F 3/03547 345/161 |
| 2013/0093685 A1* | 4/2013 | Kalu | G06F 3/04886 345/173 |
| 2013/0111370 A1* | 5/2013 | Pasquero | G06F 3/0481 715/761 |
| 2013/0301907 A1* | 11/2013 | Shim | G06K 9/00201 382/154 |
| 2014/0129170 A1* | 5/2014 | Ramachandran | G01P 21/00 702/93 |
| 2014/0168124 A1* | 6/2014 | Park | G06F 3/016 345/173 |
| 2014/0213357 A1* | 7/2014 | Claffey | A63F 7/0668 463/31 |
| 2014/0267006 A1* | 9/2014 | Raffa | G06F 1/1626 345/156 |
| 2014/0354548 A1* | 12/2014 | Lee | G06F 3/038 345/166 |
| 2016/0216782 A1* | 7/2016 | Lin | G06F 3/0484 |
| 2016/0252959 A1* | 9/2016 | Rosenberg | A63F 13/06 345/173 |
| 2017/0212591 A1* | 7/2017 | Churikov | G06F 3/03547 |
| 2018/0032518 A1* | 2/2018 | Kordasiewicz | G06F 16/156 |
| 2018/0095541 A1 | 4/2018 | Gribetz et al. | |
| 2019/0034076 A1* | 1/2019 | Vinayak | G06T 19/006 |
| 2019/0163281 A1* | 5/2019 | Cain | G06F 3/0487 |
| 2020/0348765 A1* | 11/2020 | Gurovich | G06F 3/0346 |
| 2021/0225083 A1* | 7/2021 | McKee | G06T 19/006 |

OTHER PUBLICATIONS

Buschel et al. (https://dl.acm.org/doi/pdf/10.1145/2598153.2598179; pub date: 2014; downloaded Aug. 28, 2021) (Year: 2014).*

Alexander Kulik et al., "RST 3D: A Comprehensive Gesture Set for Multitouch 3D Navigation", Virtual Reality and Visualization Research Group, Bauhaus Universitat Weimar, 8 pages.

(56) References Cited

OTHER PUBLICATIONS

Miareike Kritzleretal, "The Virtual Twin: Controlling Smart Factories using a spatially-correct Augmented Reality Representation", IoT 17, Linz, Austria, Oct. 22-25, 2017, 2 pages.

* cited by examiner

SYSTEMS AND METHODS FOR INTERACTING WITH A TABLETOP MODEL USING A MOBILE DEVICE

TECHNICAL FIELD

The present disclosure relates to systems and methods for interacting with a tabletop model.

BACKGROUND

Tabletop models, such as a model of a transportation operating system (TOS), allow users to explore features and objects of the model. However, interacting with the tabletop model may be difficult, for example, where objects are out of physical reach of a user.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
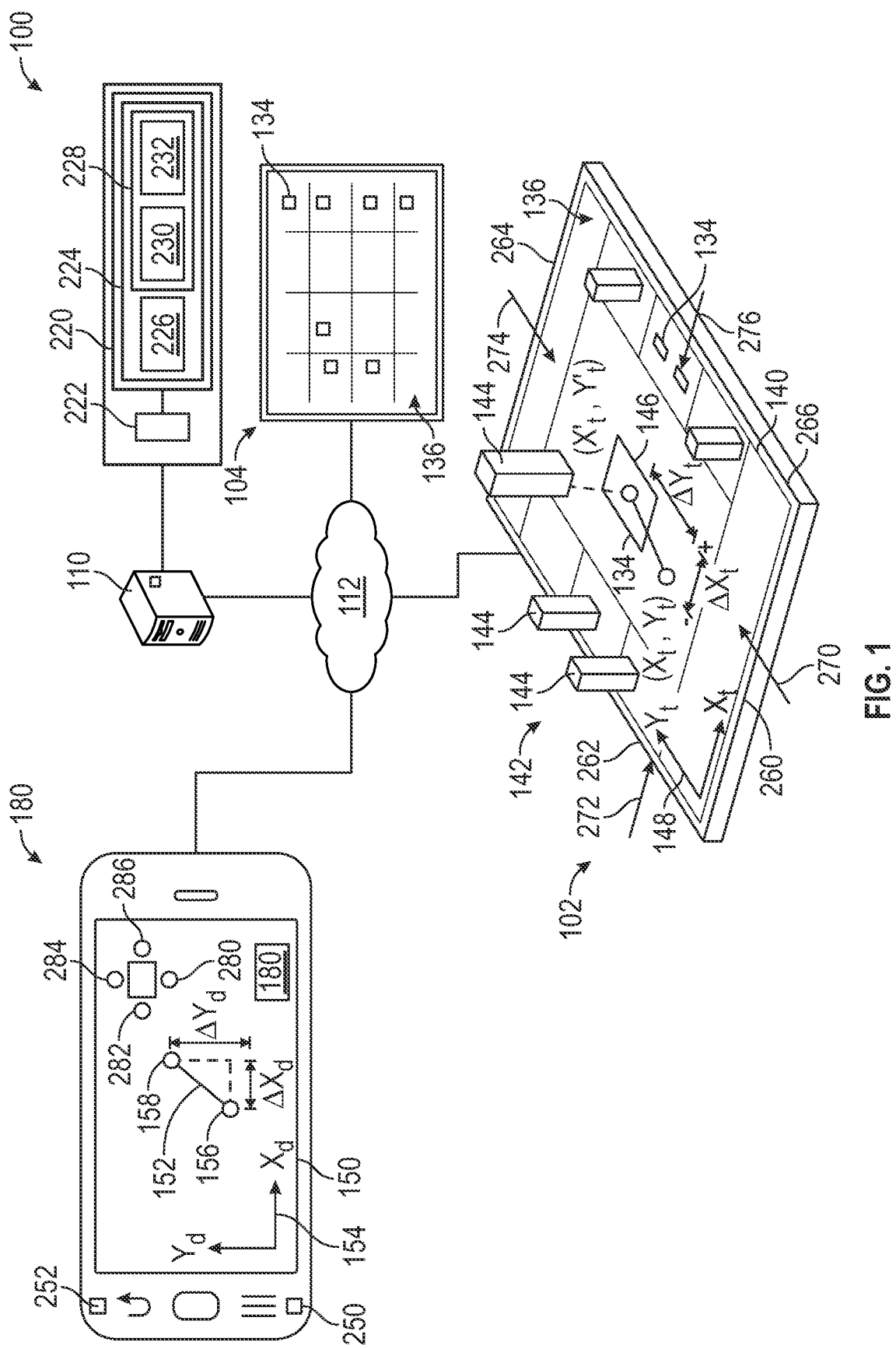
FIG. 1 depicts a display system including a tabletop model and a mobile device in accordance with the disclosure.

Referring to FIG. 1, a display system 100 includes a tabletop model 102 and one or more devices for interacting with the tabletop model 102 including a mobile device 108. The display system may also include a vertical display 104 and one or more computer systems including a system computer 110. The tabletop model 102, vertical display 104, the mobile device 108, and the system computer 110 may communicate with one another over a network 112.

The tabletop model 102 includes a horizontal display 140 and a three-dimensional physical model 142. The system computer 110 displays a two-dimensional digital map 136 on the horizontal display 140 (e.g., a tabletop display) and/or on the vertical display 104. The three-dimensional physical model 142 overlays the two-dimensional digital map 136 on the horizontal display 140.

The two-dimensional digital map 136 includes two-dimensional digital objects 134 and the three-dimensional physical model 142 includes three-dimensional physical objects 144. The three-dimensional physical objects 144 align with the two-dimensional digital objects 134 of the horizontal display 140.

The horizontal display includes a horizontal display coordinate system 148 (xt, yt).

The mobile device 108 includes a touchscreen display 150. The display system 100 is configured to determine a movement and position of a cursor 146 on or over the two-dimensional digital map 136 based on a movement 152 or action on the touchscreen display 150. The touchscreen display 150 may include a mobile device coordinate system 154 (xd, yd).

A movement 152 may include a slide movement of a finger on the touchscreen display 150 from a start position 156 to an end position 158 (e.g., a vector). The distance and direction ($\Delta$xd, $\Delta$yd) of the movement 152 is determined and used to determine the distance and direction ($\Delta$xt, $\Delta$yt) to move the cursor 146 on the coordinate system 148 (xt, yt) of the horizontal display 140.

Figure 2:
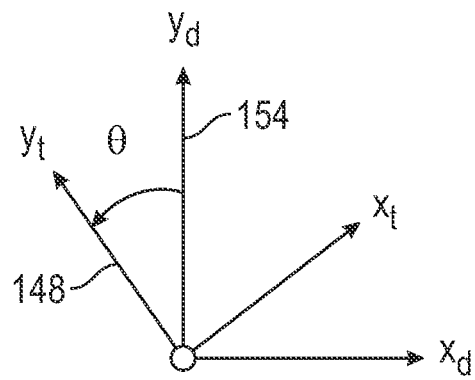
FIG. 2 depicts a rotation angle in accordance with the present disclosure.

The mobile device 108 determines a transformation matrix that relates the mobile device coordinate system 154 (xd, yd) and the horizontal display coordinate system 148 (xt, yt). For example, referring to FIG. 2, the coordinate systems 154, 148 may be treated as having a common origin with the horizontal display coordinate system 148 (xd, yd) rotated clockwise with respect to the mobile device coordinate system 154 (xt, yt) by a rotation angle $\theta$. The rotation angle $\theta$ is based on a location of the mobile device 108 around the tabletop model 102.

Once the rotational angle $\theta$ between the coordinate system 154, 148 is determined, the display system 100 can transform a movement 152 on the touchscreen display 150 to a movement of the cursor 146 on the two-dimensional digital map 136.

The cursor 146 can be moved to a position (xt', yt') over (e.g., in the cross-sectional area of) a two-dimensional digital object 134. The display system 100 may provide visual and haptic feedback to a user when the cursor 146 is over a two-dimensional digital object 134 to indicate that the object (e.g., such as a building or street) can be selected. For example, the two-dimensional digital object 134 may be highlighted with a first color (or other visual feedback) and the mobile device 108 may vibrate with a first vibration pattern (or other haptic feedback).

The haptic feedback creates a unique sensation to "feel" an object. The visual highlighting and haptic feedback improve the ability of a user to navigate the tabletop model 102 using the mobile device 108.

The mobile device 108 includes inputs to select an object. For example, the touchscreen display 150 may be tapped or the mobile device 108 may display one or more buttons 180 that can be pressed to select an object and then to unselect an object. The mobile device 108 may provide feedback to the user when an object is selected. For example, the two-dimensional digital object may be highlighted with a second color (e.g., visual feedback) and the mobile device 108 may vibrate with a second vibration pattern (e.g., haptic feedback).

Upon receiving a selection of an object from the mobile device 108, the display system 100 may also highlight a selected object on the vertical display 104. In addition, the display system 100 may access and display object data 228 on the vertical display 104.

Illustrative Embodiments

Referring to FIG. 1, the display system 100 includes the tabletop model 102 and one or more devices for interacting with the tabletop model 102 including the mobile device 108. The display system may also include the vertical display 104 and one or more computer systems including a system computer 110.

Functions disclosed herein can be executed internally by the tabletop model 102, the vertical display 104, and the mobile device 108; and/or can be executed externally by the system computer 110. Generally, the functions of the display system 100 may be centralized or decentralized among the elements of the display system 100.

The tabletop model 102, vertical display 104, the mobile device 108, and the system computer 110 may communicate with one another over the network 112. The network 112 may include any one or a combination of multiple different types of networks, such as cable networks, the Internet, wireless networks, and other private and/or public networks. In some instances, the network 112 may include cellular, Wi-Fi, or Wi-Fi direct.

The system computer 110 includes a memory 220 and a processor 222. The memory 220 stores instructions that are executed by the processor 222 to perform aspects of methods disclosed herein. When referring to operations executed by the system computer 110, it will be understood that this may include the execution of instructions by the processor 222.

Each of the tabletop model 102, vertical display 104, and the mobile device 108 may similarly include a memory and processor for executing instructions of the methods described herein. For purposes of illustration, the methods may be described as being executed by the system computer 110.

The memory 220 includes geospatial data 224. The geospatial data 224 includes feature data such as event data 226 and object data 228. For example, event data 226 may include traffic information, environmental information (e.g., from a weather station), temporal information (e.g., the time period at which the event exists), and the like.

Object data 228 includes data associated with an object such as an object location 230, object attribute information 232, and a two-dimensional digital object 134 of a two-dimensional digital map 136. Objects may include roads, buildings, districts, neighborhoods, bodies of water, parks, vehicles, pedestrians, public transportation systems, and the like. For purposes of illustration, a building may be discussed in further detail below as an exemplary object.

The object location 230 may be coordinates on the coordinate system 148 of the horizontal display 140. The attribute information 232 (e.g., characteristics of the object) may include descriptions, statistics, graphics, and other information associated with the object.

The two-dimensional digital object 134 may be a footprint, graphical representation, or two-dimensional digital polygon-shaped cross-sectional area. The two-dimensional digital object 134 may define an area of connected streets or the footprint of a building.

The system computer 110 is configured to compile and format the geospatial data 224 to generate an image of the two-dimensional digital map 136 (e.g., a planner representation) of a geographical area. The two-dimensional digital object 134 of an object is positioned at an associated object location 230 on the two-dimensional digital map 136.

The system computer 110 displays the two-dimensional digital map 136 on the horizontal display 140 (e.g., a tabletop display) of the tabletop model 102 and/or on the vertical display 104.

The tabletop model 102 includes the horizontal display 140 and the three-dimensional physical model 142.

The horizontal display 140 may be a light emitting diode (LED) tabletop display for use in a transportation operating system (TOS) model. For example, the horizontal display 140 may provide a map of city streets or a geographical area. The three-dimensional physical model 142 overlays the two-dimensional digital map 136 on the horizontal display 140.

The horizontal display 140 can be controlled to alter any of a hue, intensity, color, brightness, and/or other similar attribute of the two-dimensional digital object 134. For example, after selection of an object, the system computer 110 may change a color or intensity of light of the associated two-dimensional digital object 134 to highlight the selected object.

The three-dimensional physical model 142 overlays the two-dimensional digital map 136 on the horizontal display 140. The three-dimensional physical model 142 includes three-dimensional physical objects 144.

The three-dimensional physical objects 144 align with the two-dimensional digital objects 134 of the horizontal display 140. The scale of the two-dimensional digital map 136 and the scale of the three-dimensional physical model 142 are selected, and the three-dimensional physical model 142 is positioned on the two-dimensional digital map 136, such that a three-dimensional physical object 144 has the object location 230 of a corresponding two-dimensional digital object 134 (e.g., vertically aligned with one another as shown in FIG. 1). The three-dimensional physical object 144 overlays the corresponding two-dimensional digital object 134.

The three-dimensional physical model 142 may be printed or manufactured with a translucent material such as a polymer or glass. When a two-dimensional digital object 134 is highlighted, light from the two-dimensional digital object 134 is transmitted through the aligned three-dimensional physical object 144 to illuminate and highlight the three-dimensional physical object 144.

The horizontal display 140 includes the horizontal display coordinate system 148 (xt, yt).

The mobile device 108 is configured to control the movement and position of the cursor 146 on the two-dimensional digital map 136. The display system 100 is configured to determine a movement and position of the cursor 146 based on a movement 152 or action on the touchscreen display 150.

The touchscreen display 150 may include a coordinate system 154 (xd, yd) and a movement 152 may include a slide movement of a finger on the touchscreen display 150 from a start position 156 to an end position 158 (e.g., a vector). The distance and direction (Δxd, Δyd) of the movement 152 is determined and used to determine the distance and direction (Δxt, Δyt) to move the cursor 146 on the coordinate system 148 (xt, yt) of the horizontal display 140.

The mobile device 108 determines a transformation matrix that relates the mobile device coordinate system 154 (xd, yd) and the horizontal display coordinate system 148 (xt, yt). For example, referring to FIG. 2, the coordinate systems 154, 148 may be treated as having a common origin with the horizontal display coordinate system 148 (xd, yd) rotated clockwise with respect to the mobile device coordinate system 154 (xt, yt) by a rotation angle θ. The rotation angle θ may be based on a location of the mobile device 108 around the tabletop model 102.

For example, the rotation angle θ may be the difference between a y-axis (yt) of the horizontal display coordinate system 148 (xt, yt) and a y-axis (yd) of the mobile device coordinate system 154 (xd, yd). When holding the mobile device 108 and facing the tabletop model 102, the y-axis (yd) of the mobile device coordinate system 154 (xd, yd) points toward the tabletop model 102. The y-axis (yt) of the horizontal display coordinate system 148 (xt, yt) may be measured at a clockwise angle to the y-axis (yd) of the mobile device coordinate system 154 (xd, yd).

The rotation angle θ may be determined based on the difference in angle between a directional measurement of a compass sensor 250 (e.g., that aligns with the y-axis (yd)) and a known fixed value of a compass direction of the y-axis (yt). The rotation angle θ may also be determined using an inertial measurement unit 252 of the mobile device 108 and a three-dimensional rotation matrix. The inertial measurement unit may be used to determine the direction of the y-axis (yd) after an initial direction is determined as described below.

The inertial measurement unit 252 (IMU) may include one or more sensors that measure force, angular rate, orientation, direction and the like. The sensors may include, for example, an accelerometer, a gyroscope, and a magnetometer (e.g., the compass sensor 250).

The rotational angle may be updated as the mobile device 108 is moved around (e.g., to different sides) of the tabletop model 102.

The rotation angle θ may be approximated as one of four rotational angles, for example, to determine an initial measurement of the rotation angle θ or in place of using the compass sensor 250.

First, as the tabletop model 102 has four sides 260, 262, 264, 266, the direction of the y-axis (yd) of the mobile device coordinate system 154 can be approximated by one of four directions. A direction of the y-axis (yd) may be approximated based on a location of the mobile device 108 on a side 260, 262, 264, 266 of the tabletop model 102.

If the mobile device 108 is on the first side 260, the y-axis (yd) has a first direction 270; if the mobile device 108 is on the second side 262, the y-axis (yd) has a second direction 272; if the mobile device 108 is on the third side 264, the y-axis has a third direction 274; and if the mobile device 108 is on a fourth side 266, the y-axis has a fourth direction 276.

Then, the rotation angle θ can be approximated by one of four angles based on the four directions 270, 272, 274, 276 of the y-axis (yd). For purposes of teaching, if the y-axis (yt) of the horizontal display coordinate system 148 has the first direction 270: the rotation angle θ when the mobile device 108 is on the first side 260 (y-axis (yd) has the first direction 270) is zero degrees, the rotation angle θ when the mobile device 108 is on the second side 262 (y-axis (yd) has the second direction 272) is ninety degrees; the rotation angle θ when the mobile device 108 is on the third side 264 (y-axis (yd) has the third direction 274) is one hundred eighty degrees; and the rotation angle θ when the mobile device 108 is on the fourth side 266 (y-axis (yd) has the fourth direction 276) is two hundred seventy degrees.

The mobile device 108 may include an input to indicate a side of the tabletop model relative to where the mobile device is located when facing the tabletop model and thereby determine a rotation angle. For example, the mobile device may include four buttons 280, 282, 284, 286 that are arranged to correspond to the four sides 260, 262, 264, 266 of the tabletop model 102. The user may be prompted to choose the button 280, 282, 284, 286 that corresponds to one of the sides of the tabletop model 102. As the button for the one of the sides 260, 262, 264, 266 of the tabletop model 102 is different when the mobile device 108 is on each of the four sides 260, 262, 264, 266, each button can be associated with one of four rotation angles θ as described above.

For purposes of teaching, if a user is prompted by the mobile device 108 and/or the tabletop model 102 to select the first side 260: the button 280 is selected when the mobile device 108 is on the first side 260 and rotation angle θ associated with the button 280 is zero degrees; the button 286 is selected when the mobile device 108 is on the second side 262 and the rotation angle θ associated with the button 286 is ninety degrees; the button 284 is selected when the mobile device 108 is on the third side 264 and the rotation angle θ associated with the button 284 is one hundred eighty degrees; and the button 282 is selected when the mobile device 108 is on the fourth side 266 and the rotation angle θ associated with the button 282 is two hundred seventy degrees.

Once a rotation angle θ is determined, a transformation matrix can be determined. Using the transformation matrix, the distance and direction (Δxd, Δyd) of the movement 152 corresponds to the distance and direction (Δxt, Δyt) of the cursor 146. A weight a may be used to change how much the cursor 146 moves for a given the distance and direction (Δxd, Δyd) of the movement 152. The weight a may account for the limitations of the size of the touchscreen display 150 and differences in size between the touchscreen display 150 and the horizontal display 140. The equations for determining the distance and direction (Δxt, Δyt) to move the cursor 146 may be given in matrix form as:

$$\begin{bmatrix} \Delta x_t \\ \Delta y_t \end{bmatrix} = \alpha \begin{bmatrix} \cos\theta & \sin\theta \\ -\sin\theta & \cos\theta \end{bmatrix} \begin{bmatrix} \Delta x_d \\ \Delta y_d \end{bmatrix}$$

The distance and direction (Δxt, Δyt) to move the cursor 146 is added to the current location (xt, yt) of the cursor 146 to determine the new location (xt', yt') of the cursor 146. The equations for determining the new location (xt', yt') of the cursor 146 may be given as:

$x_t' = x_t + \Delta x_t$ $y_t' = y_t + \Delta y_t$

The cursor 146 is displayed on the horizontal display 140. The cursor 146 can be moved to a position (xt', yt') in the area of a two-dimensional digital object 134. The mobile device 108 may provide feedback to the user when the cursor 146 is in the area of a two-dimensional digital object 134 to indicate that the object (e.g., such as a building or street) can be selected. For example, the two-dimensional digital object 134 may be highlighted with a first color (e.g., visual feedback) and the mobile device 108 may vibrate with a first vibration pattern (e.g., haptic feedback).

The feedback creates a unique sensation to "feel" an object. The visual highlighting and haptic feedback confirmation improve the accuracy and ability to navigate the tabletop model 102 using the mobile device 108.

The mobile device 108 includes inputs to select an object. For example, the touchscreen display 150 may be tapped or the mobile device 108 may display one or more buttons 180 that can be pressed to select an object and/or then to unselect an object. The mobile device 108 may provide feedback to the user when an object is selected. For example, the two-dimensional digital object may be highlighted with a second color (e.g., visual feedback) and the mobile device 108 may vibrate with a second vibration pattern (e.g., haptic feedback).

Upon receiving a selection of an object from the mobile device 108, the display system 100 may also highlight a selected object on the vertical display 104.

To highlight an object on the tabletop model 102 and the vertical display 104, the associated two-dimensional digital object 134 is highlighted with a brightness, intensity, color, tint, hue, and/or other visual attribute. For the tabletop model 102, as the three-dimensional physical model 142 may be printed or manufactured with a translucent material such as a polymer or glass, when a two-dimensional digital object 134 is highlighted, light from the two-dimensional digital object 134 is transmitted through the aligned three-dimensional physical object 144 to illuminate and highlight the three-dimensional physical object 144.

In addition, the display system 100 may access and display object data 228 on the vertical display 104.

Figure 3:
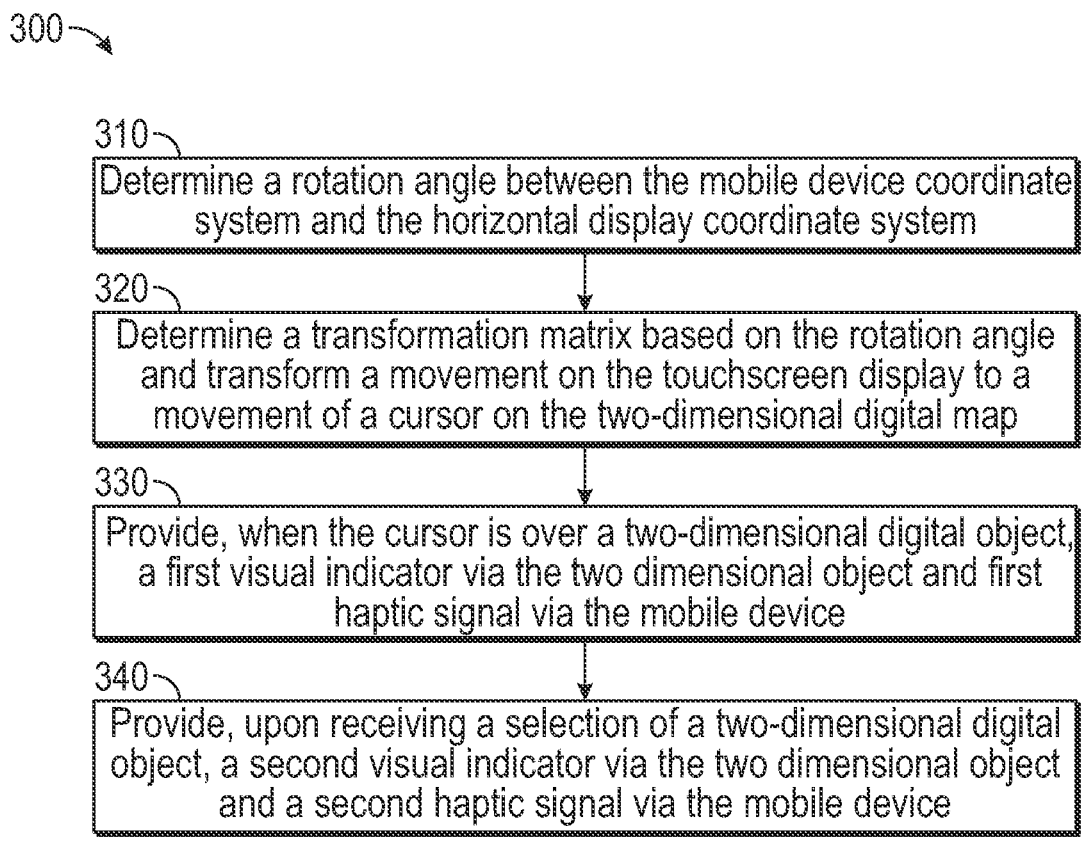
FIG. 3 depicts a method of controlling a cursor of the tabletop model with the mobile device in accordance with the present disclosure.

Referring to FIG. 3, an exemplary method 300 performed by the display system 100 is described.

According to a first step 310, the display system 100 determines a rotation angle between the mobile device coordinate system 154 and the horizontal display coordinate system 148.

According to a second step 320, the display system 100 determines a transformation matrix based on the rotation angle and transforms a movement on the touchscreen display to a movement of a cursor on the two-dimensional digital map.

According to a third step 330, the display system 100 determines that the cursor is over a two-dimensional digital object and provides a first visual indicator via the two dimensional object and first haptic signal via the mobile device 108.

According to a fourth step 340, the display system 10 receives a selection of an object and provides a second visual indicator via the two dimensional object and a second haptic signal via the mobile device 108. In addition, the display system 100 may access and display object data 228 on the vertical display 104.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A display system, comprising:
   a tabletop model, including:
      a horizontal display that is configured to display a two-dimensional digital map; and
      a three-dimensional physical model that is configured to overlay the two-dimensional digital map; and
   a mobile device comprising a touchscreen display and an inertial measurement unit comprising at least one sensor;
   wherein the display system is configured to:
      determine a rotational angle between a mobile device coordinate system and a horizontal display coordinate system, wherein the rotational angle is based on a location of the mobile device around the tabletop model, and wherein the rotational angle is updated as the mobile device is moved around the tabletop model based on measurements of the inertial measurement unit and a three-dimensional rotation matrix; and
      transform a movement on the touchscreen display to a movement of a cursor on the two-dimensional digital map based at least in part on a transformation matrix comprising a weight and the rotational angle,
   wherein the rotational angle is based on a selection of a side of the tabletop model with the mobile device via a button at the mobile device that corresponds to the side of the tabletop model with the mobile device.

2. The display system of claim 1, wherein the two-dimensional digital map includes a two-dimensional digital object.

3. The display system of claim 2, wherein the two-dimensional digital object is a footprint of a building.

4. The display system of claim 2, wherein the mobile device includes an input to select the two-dimensional digital object when the cursor is over the two-dimensional digital object.

5. The display system of claim 4, wherein the two-dimensional digital object is highlighted when the cursor is over the two-dimensional digital object to indicate to a user that the two-dimensional digital object can be selected.

6. The display system of claim 5, wherein the two-dimensional digital object is highlighted with a first visual indicator when the cursor is over the two-dimensional digital object and not selected and is highlighted with a second visual indicator when the two-dimensional digital object is selected.

7. The display system of claim 5, wherein the three-dimensional physical model includes a three-dimensional physical object, wherein light from the highlighted two-dimensional digital object is transmitted through the three-dimensional physical object.

8. The display system of claim 7, wherein the three-dimensional physical object is aligned with the two-dimensional digital object.

9. The display system of claim 7, wherein the three-dimensional physical model is transparent or translucent.

10. The display system of claim 4, wherein the mobile device vibrates when the cursor is moved over the two-dimensional digital object by a user.

11. The display system of claim 10, wherein the mobile device vibrates with a first pattern when the cursor is over the two-dimensional digital object and not selected by the user and vibrates with a second pattern when the two-dimensional digital object is selected by the user.

12. The display system of claim 4, wherein attribute information of the two-dimensional digital object is displayed when the two-dimensional digital object is selected.

13. The display system of claim 1, wherein the rotational angle is based on a difference between a measurement of a compass sensor of the mobile device and a known fixed value of a compass direction of a y-axis of the horizontal display coordinate system.

14. The display system of claim 1, wherein the movement on the touchscreen display is a slide movement of a finger from a start position to an end position.

15. A method, comprising:
determining a rotational angle between a mobile device coordinate system and a horizontal display coordinate system, wherein:
a tabletop model, includes:
a horizontal display that is configured to display a two-dimensional digital map, the horizontal display including the horizontal display coordinate system; and
a three-dimensional physical model that is configured to overlay the two-dimensional digital map; and
a mobile device includes a touchscreen display and an inertial measurement unit comprising at least one sensor, the mobile device including the mobile device coordinate system;
and wherein the rotational angle is based on a location of the mobile device around the tabletop model;
and wherein the rotational angle is updated as the mobile device is moved around the tabletop model based on measurements of the inertial measurement unit and a three-dimensional rotation matrix; and
selecting a side of the tabletop model to determine the rotational angle via a button at the mobile device that corresponds to the side of the tabletop model with the mobile device; and
transforming a movement on the touchscreen display to a movement of a cursor on the two-dimensional digital map based at least in part on a transformation matrix comprising a weight and the rotational angle.

16. The method of claim 15, comprising providing, when the cursor is over a two-dimensional digital object, at least one of a first visual indicator via the two dimensional digital object and a first haptic signal via the mobile device, and wherein the two-dimensional digital object is highlighted when the cursor is over the two-dimensional digital object to indicate to a user that the two-dimensional digital object can be selected, and wherein light from the highlighted two-dimensional digital object is transmitted through a three-dimensional physical object.

17. The method of claim 16, comprising providing, when an object is selected by the user, at least one of a second visual indicator via the two-dimensional digital object and a second haptic signal via the mobile device.

* * * * *